United States Patent
Nadalin et al.

(10) Patent No.: US 10,313,513 B2
(45) Date of Patent: Jun. 4, 2019

(54) SYSTEMS AND METHODS FOR PROVIDING A MULTI-CHANNEL COMMUNICATION SERVICE

(71) Applicant: NEXMO, Inc., San Francisco, CA (US)

(72) Inventors: Eric Nadalin, London (GB); Neil Stratford, London (GB); Roland Selmer, London (GB)

(73) Assignee: NEXMO INC., San Francisco, CA (US)

( * ) Notice: Subject to any disclaimer, the term of this patent is extended or adjusted under 35 U.S.C. 154(b) by 0 days.

(21) Appl. No.: 15/899,981

(22) Filed: Feb. 20, 2018

(65) Prior Publication Data

US 2018/0176369 A1    Jun. 21, 2018

Related U.S. Application Data

(63) Continuation of application No. 15/373,904, filed on Dec. 9, 2016, now Pat. No. 9,912,808.

(60) Provisional application No. 62/321,659, filed on Apr. 12, 2016.

(51) Int. Cl.
| | |
|---|---|
| H04M 1/64 | (2006.01) |
| H04M 3/42 | (2006.01) |
| H04M 3/56 | (2006.01) |
| H04L 12/18 | (2006.01) |
| H04M 3/51 | (2006.01) |
| H04M 3/58 | (2006.01) |
| H04L 12/46 | (2006.01) |

(52) U.S. Cl.
CPC .... *H04M 3/42221* (2013.01); *H04L 12/1831* (2013.01); *H04L 12/4625* (2013.01); *H04M 3/5175* (2013.01); *H04M 3/56* (2013.01); *H04M 3/58* (2013.01); *H04M 2203/404* (2013.01); *H04M 2203/5018* (2013.01)

(58) Field of Classification Search
CPC ............ H04M 3/42221; H04M 3/5175; H04L 12/1831; H04L 12/4625
See application file for complete search history.

(56) References Cited

U.S. PATENT DOCUMENTS

| | | |
|---|---|---|
| 2006/0265090 A1 | 11/2006 | Conway et al. |
| 2008/0298253 A1 | 12/2008 | Walker et al. |
| 2011/0116492 A1 | 5/2011 | Byron et al. |
| 2011/0134804 A1 | 6/2011 | Maes |

(Continued)

OTHER PUBLICATIONS

Jun. 29, 2017 International Search Report & Written Opinion issued in PCT Application No. PCT/US2017/026555.

*Primary Examiner* — Simon King
(74) *Attorney, Agent, or Firm* — FisherBroyles, LLP; Joseph Pagnotta

(57) ABSTRACT

A multi-channel communication service uses an object-oriented approach to processing communications. The multi-channel communication service is capable of receiving, at a conversation object generator, inbound communications sent from a communication service and subsequently managing the status of participants engaged in a conversation via the various inbound communications. The management process is achieved by associating the inbound communications to corresponding client applications and executing an invitation process from the client applications to a conversation created by the conversation object generator.

20 Claims, 11 Drawing Sheets

(56) References Cited

U.S. PATENT DOCUMENTS

| | | | |
|---|---|---|---|
| 2012/0215900 A1* | 8/2012 | Moyers | H04L 65/1069 709/223 |
| 2014/0297876 A1* | 10/2014 | Aquilina | G06F 3/0488 709/227 |
| 2015/0063556 A1 | 3/2015 | Uba et al. | |
| 2015/0127729 A1* | 5/2015 | Madhavan | G06F 17/30867 709/204 |
| 2015/0295777 A1* | 10/2015 | Cholkar | G06F 3/04842 715/753 |
| 2016/0335074 A1* | 11/2016 | Olivier | H04L 67/1095 |
| 2017/0064075 A1 | 3/2017 | Chatterjee | |

* cited by examiner

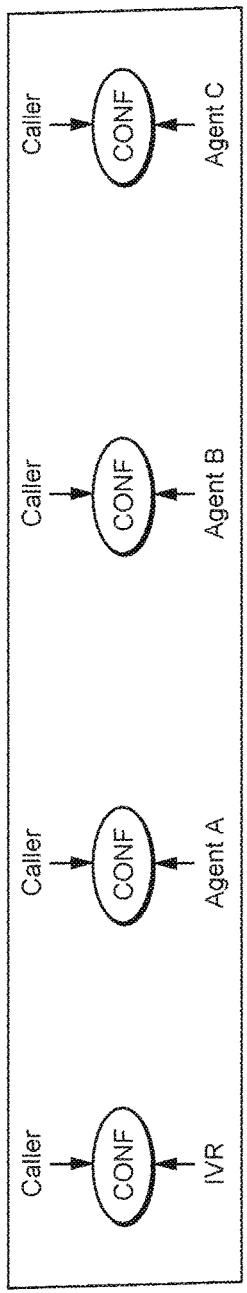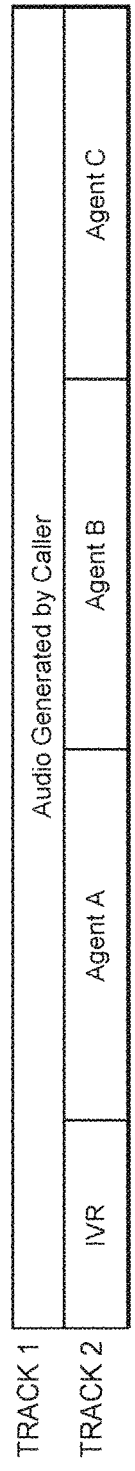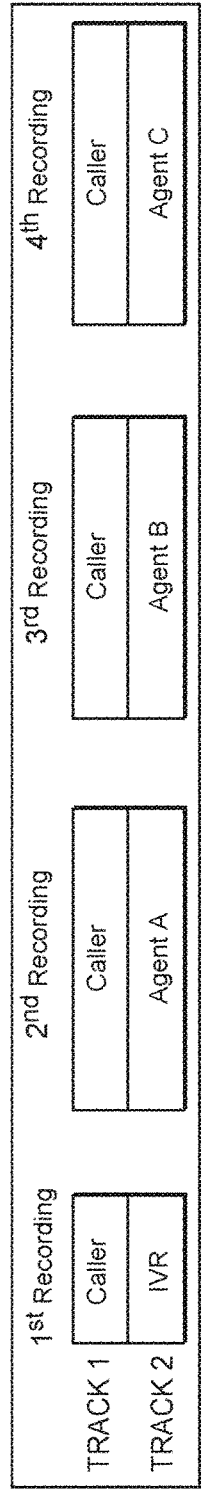

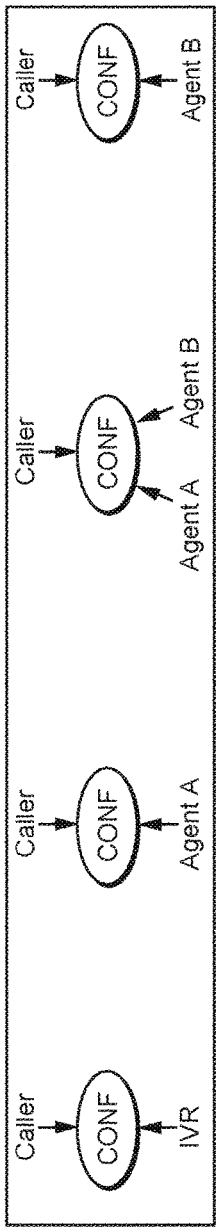
FIGURE 11A
FIGURE 11B
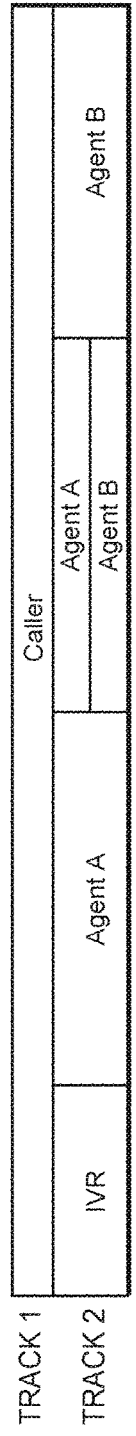
FIGURE 11C
Recording Made by A Multi-Channel Communication Service
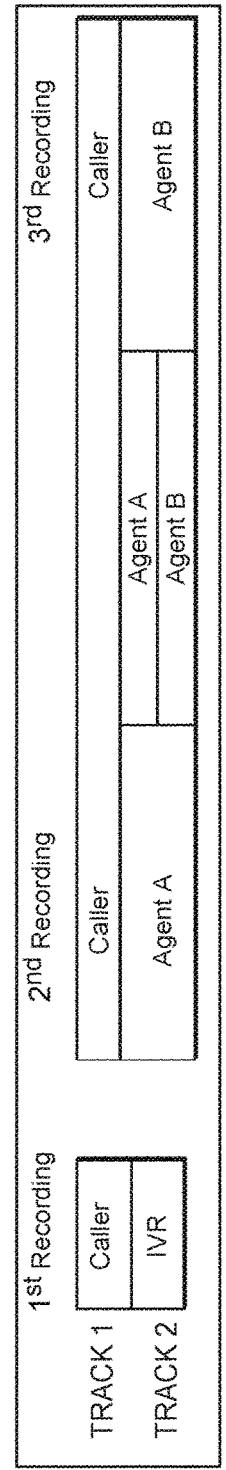
FIGURE 11D
Prior Art Recording Method

SYSTEMS AND METHODS FOR PROVIDING A MULTI-CHANNEL COMMUNICATION SERVICE

This application is a Continuation of U.S. application Ser. No. 15/373,904, filed Dec. 9, 2016, which issued as U.S. Pat. No. 9,912,808 on Mar. 6, 2018, which application claimed priority to the filing date of U.S. Provisional Patent Application No. 62/321,659, filed Apr. 12, 2016. The content of both cited applications is hereby incorporated herein by reference.

BACKGROUND

The present application relates to communication services that are designed to help businesses communicate with their customers.

Presently, when a business wishes to send communications to its customers, it is often necessary for the business to use multiple different communication channels to reach all of their customers. For example, customers who only possess an analog telephone can only be reached via an audio telephone call. Other customers who have a smartphone can be reached by an audio telephone call, but also via a SMS or MMS "text" message. Still other customers may only be reachable via an email communication.

When a business must use multiple different communication channels to reach its customers, the business is often forced to create messages in multiple different formats, and to then send the different formatted messages via corresponding communication channels. The situation becomes even more complex when the business must deliver such messages to customers in a wide variety of different markets or countries. When messages are to be delivered in multiple different countries, different languages are often used. In addition, the format and delivery requirements for audio communications, text messages and email messages can vary from country to country, with each different location using a different standard.

It would desirable for a business to utilize the services of a third party that can facilitate the delivery of communications to the business' customers. The third party could receive a message which a business wishes to disseminate to its customers, and the third party could handle the formatting and delivery of the message via the most appropriate communication channels. This would relieve the business of the need to develop and maintain expertise on the requirements of the various communication channels, freeing the business to concentrate on its core mission.

Another problem facing a business that provides its customers with access to customer service agents relates to how customer calls to those service agents are recorded. During a typical customer call to a service agent, it is common for the customer to be transferred from a first service agent to a second agent. When the customer's call is recorded by the business, this usually results in two separate recordings, a first recording of the customer's interaction with the first service agent and a second recording of the customer's interaction with the second service agent. Those two separate recordings must then be associated with one another in some fashion in order to preserve an accurate representation of the customer's interactions with the business' service agents.

It would be desirable for the business to create a single continuous recording which includes all of the customer's interactions with all of the business's service agents. This simplifies the recording process and simplifies the steps which are later necessary to re-create the customer's experience in interacting with the business' service agents.

BRIEF DESCRIPTION OF THE DRAWINGS

FIGS. 9A-9C are diagrams that illustrate how the recording is performed in the method of FIG. 8;

FIG. 9D is a diagram illustrating how a recording is made by a prior art method;

FIGS. 11A-11C are diagrams that illustrate how the recording is performed in the method of FIG. 10; and FIG. 11D is a diagram illustrating how a recording is made by a prior art method.

DETAILED DESCRIPTION

The present application discloses a multi-channel communication service which a business can utilize to send communications to its customers. The multi-channel communication service can also help to establish communications between the business and the business' customers when the customers initiate contact with the business. For example, the multi-channel communication service can facilitate the setup of a customer's call to a business' customer service agents.

In the following description, references to a call, a telephone call or to a telephony communication are intended to cover both audio and video calls, regardless of the system that is used to conduct the calls. Also, references to a SMS or "text" messages are intended to cover both traditional short messaging service (SMS) messages, MMS messages, and other similar communications which can include text, audio and video.

Figure 1:
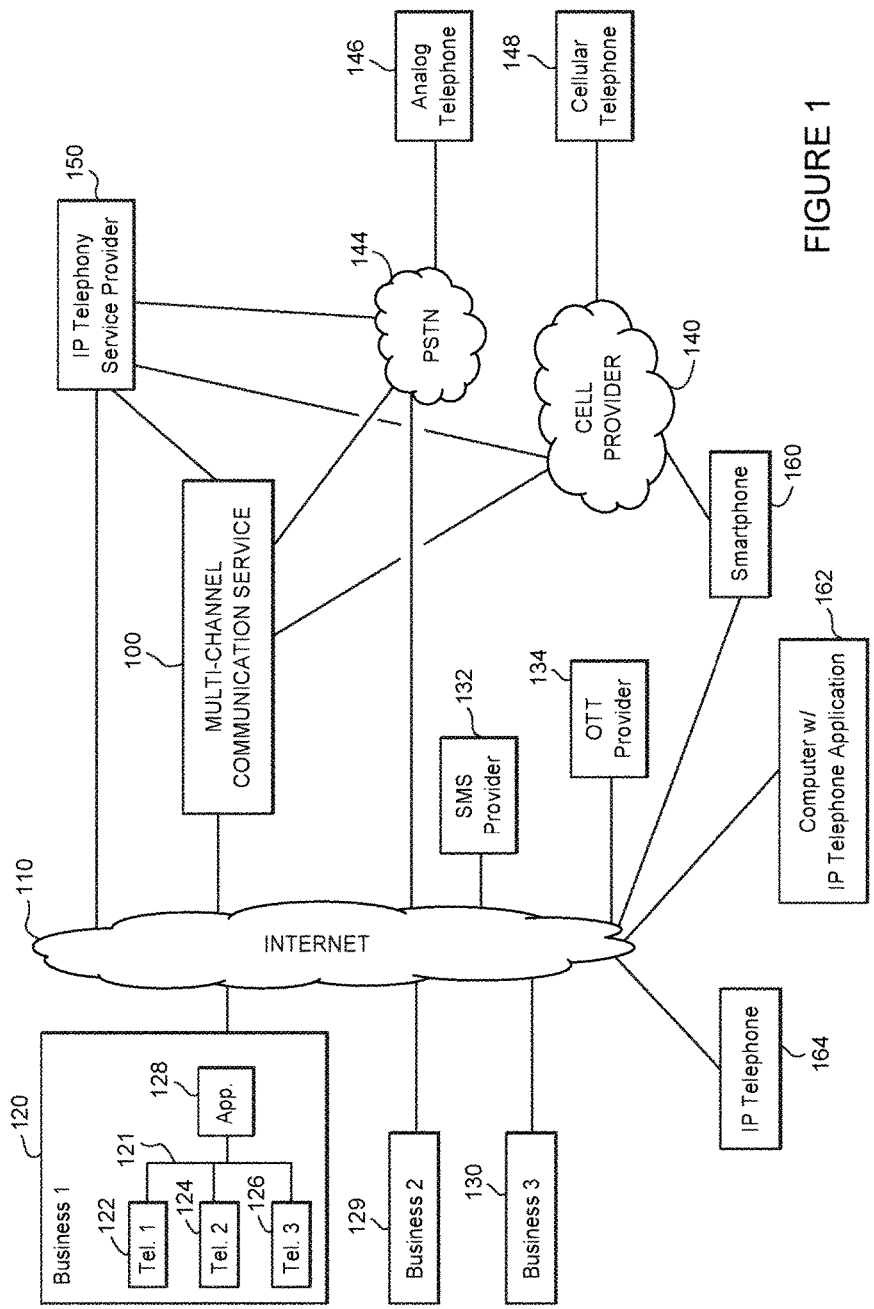
FIG. 1 is a block diagram illustrating various elements of a communication environment that includes a multi-channel communication service.

FIG. 1 illustrates a communications environment in which a multi-channel communication service 100 would exist. As shown in FIG. 1, the multi-channel communication service 100 is connected to the Internet 110, a publicly switched telephone network (PSTN) 144, a cellular telephony service provider 140, and an IP telephony service provider 150. As a result, the multi-channel communication service 100 can receive calls from customers that are established through the cellular provider 140, the PSTN 144, or an IP telephony service provider 150. The multi-channel communication service 100 then connects those calls to one or more businesses via the Internet 110.

FIG. 1 shows a first business 120 which is also connected to the Internet 110. The first business 120 includes a first telephony device 122, a second telephony device 124, and a third telephony device 126. The telephony devices are used by customer service agents of the business to conduct telephony communications with customers. The telephony devices 122, 124, 126 are connected to an internal data network 121. One or more servers connected to the internal data network 121 also run computer software applications 128. As will be explained in greater detail below, the software applications 128 act as the interface between the customer service agent telephony devices 122, 124, 126 and the multi-channel communication service 100.

A typical communications environment would also include multiple other businesses. FIG. 1 illustrates that a second business 129 and a third business 130 are also connected to the Internet 110. The second business 129 and third business 130 would also include one or more telephony devices used by customer service agents to handle incoming customer calls, and associated software applications that link the customer service agent telephony devices to the multi-channel communication service 100.

FIG. 1 also illustrates a text messaging provider 132, and an over the top (OTT) provider 134. The text message provider 132 and OTT provider 134 act to coordinate the delivery of text messages between customers and businesses. As mentioned above, the text messages could include traditional text-based messages, and also audio and video messages.

As shown in FIG. 1, customers can utilize various different telephony devices to communicate with the businesses. FIG. 1 shows an analog telephone 146 which is connected to the PSTN 144. A customer could use that analog telephone 146 to place a traditional audio call to a business. Likewise, a business could send an audio message to a customer by sending it through the PSTN 144 to the analog telephone 146.

FIG. 1 also illustrates that a customer could utilize a cellular telephone 148 that is connected to a cellular service provider 140. Another customer might utilize a smartphone 160 that is also connected to the cellular service provider 140. Customers could use the cellular telephone 148 or the smartphone 160 to place audio or video telephone calls to a business via the cellular service provider 140. Likewise, a business could send an audio communication or a text message to customers through the cellular service provider 140 which are then ultimately delivered to the cellular telephone 148 or the smartphone 160.

Some customers may have an Internet protocol (IP) telephone 164 which is connected to the Internet. The IP telephone 164 might be able to establish an IP-based communication directly with a business through the multi-channel communication service 100. Alternatively, a customer might utilize the IP telephone 164 to place a telephone call through the IP telephony service provider 150. That IP call would then be routed through the multi-channel communication service 100 to a business.

Similarly, a customer could utilize a computer which is running an IP-based telephony software application 162 in order to establish communications with a business. Here again, the customer might be able to establish an IP-based telephone call directly from the computer 162 to a business through the multi-channel communication service 100. Alternatively, that communication could be routed through the IP telephony service provider 150.

Figure 2:
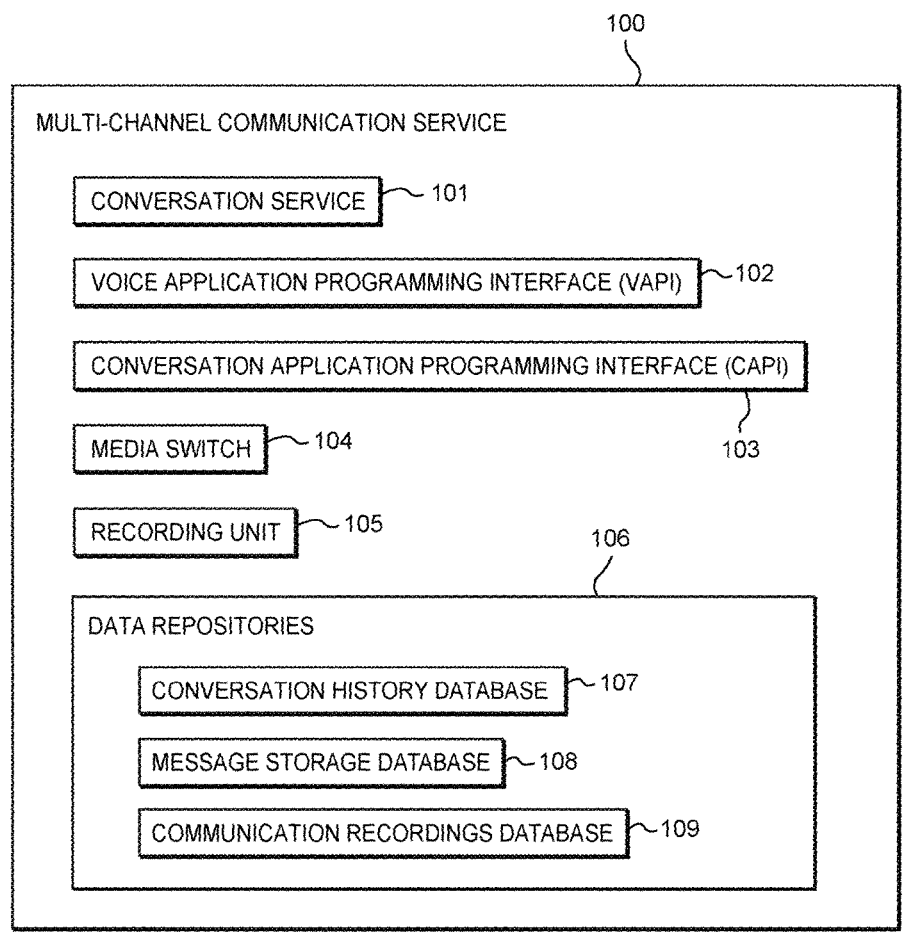
FIG. 2 is a block diagram illustrating various elements of a multi-channel communication service.

FIG. 2 illustrates various elements of a multi-channel communication service 100. The elements include a conversation service 101, a voice application programming interface (VAPI) 102, and a conversation application programming interface (CAPI) 103. The multi-channel communications service 100 could also include a media switch 104 which is used to setup communications through various telephony systems. A recording unit 105 can be provided to record communications that are established through the multi-channel communication service 100. This can include recording customer calls with service agents of a business.

Multi-channel communication service 100 further includes data repositories 106. The data repositories can include multiple different databases which include a conversation history database 107, a message storage database 108, and communication recording database 109. Of course, the data repositories 106 can include a variety of other databases, as needed.

The multi-channel communication service 100 can comprises software components, hardware components and databases that can be deployed at one or more data centers in one or more geographic locations, for example.

The media switch 104 of the multi-channel communication service 100 can include one or more data processing apparatus for connecting to the external Public Switched Telephone Network (PSTN) 144, to one or more cellular service providers 140 and to one or more IP telephony service providers 150. In some implementations, the media switch 104 bridges those external communications to the conversation service 101 using SIP. Also, in some implementations, messages sent or received through a SMS provider 132 or an OTT provider 134 can be directly received and sent by the conversation service 101, instead of going through the media switch 104.

The conversation service 101 processes inbound voice calls received from the media switch 104. Outbound voice calls originating from the VAPI 102 as a result of the VAPI 102 processing call control objects are routed through the conversation service 101 to the media switch 104, and the media switch 104 then forwards the calls to the appropriate communication network. Information about inbound and outbound calls (e.g., call log information) is recorded in the conversation history database 107 by the conversation service 101.

The multi-channel communication service 100 can make use of an object oriented method of processing communications. Essentially, when the multi-channel communication service 100 receives an incoming telephony communication, such as a telephone call, from a customer who is attempting to reach a business, the multi-channel communication service 100 contacts a software application at the business the customer is trying to reach via the Internet 110. The multi-channel communication service 100 alerts the application at the business to the existence of the incoming telephone call. The application at the business then provides a call control object to the multi-channel communication service 100. The call control object can include multiple objects, each object including an "action" and a "switch." As will be explained below, the call control object informs the multi-channel communication service 100 of how to treat the incoming call, and the multi-channel communication service 100 then acts in accordance with those instructions.

Figure 3:
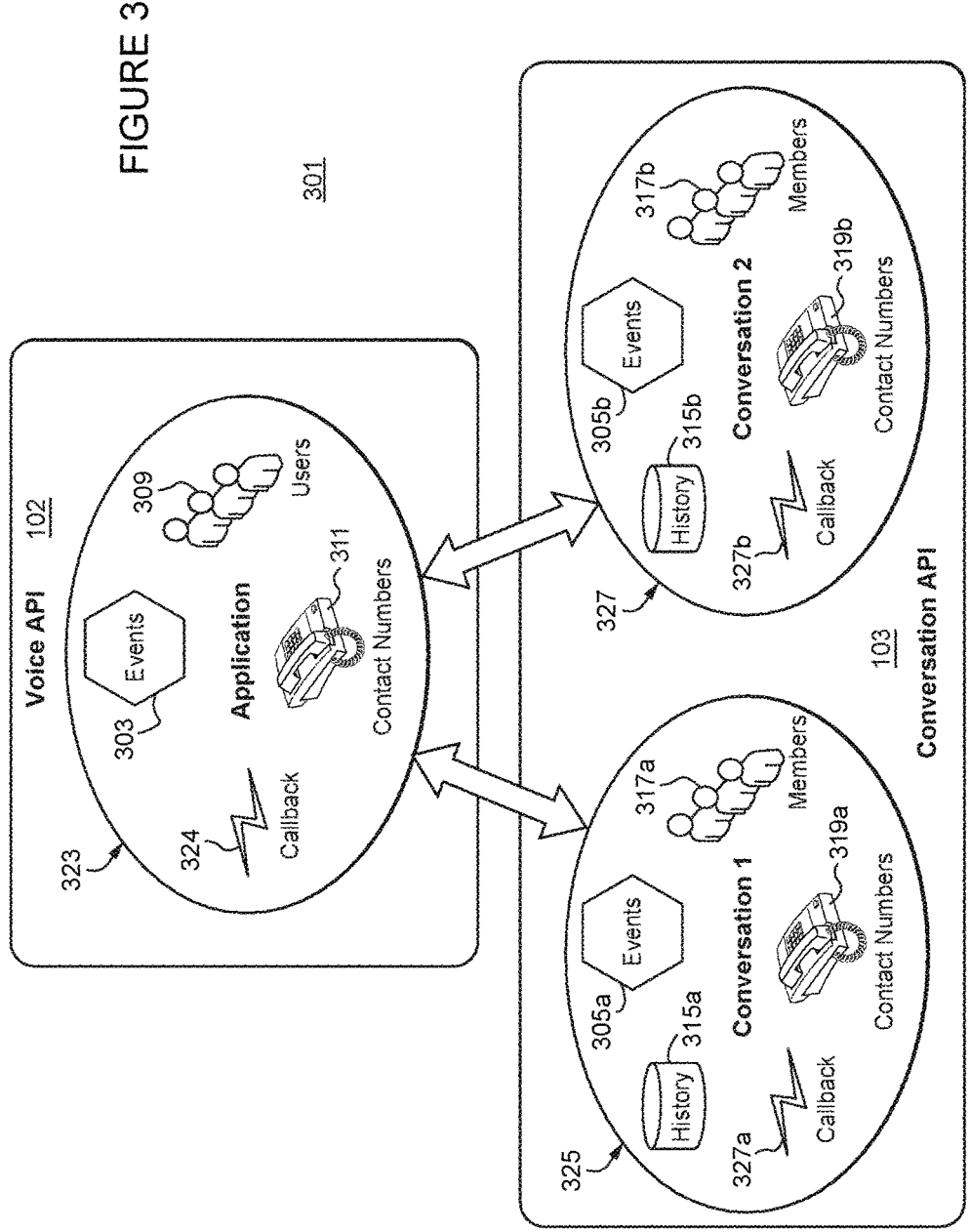
FIG. 3 depicts an example object model for facilitating the processing of communications in a multi-channel communication service.

FIG. 3 depicts an example object model 301 for the voice Application Programming Interface 102 and the conversation service 101 of the multi-channel communication service 100 illustrated in FIG. 2. The object model 301 is a logical representation of the entities in the system as maintained by the VAPI 102 and the CAPI 103. In some implementations, objects in the object model 301, such as application objects 323 and conversation objects 325, correspond to class instances or data in an object-oriented programming language or to other types of data structures. An application, such as the application 128 of the first business 120 illustrated in FIG. 1, utilizes the APIs to handle incoming communications and to create conversations among users. In some implementations, the application 128 communicates commands and events to, and receives commands and events from, the VAPI 102, the CAPI 103, or both, using one or more communication protocols such as Hypertext Transfer Protocol (HTTP), for instance. In other implementations, the application 128 can communicate directly with the VAPI 102 and the CAPI 103 using function or method calls (assuming the application 128 is in the same operating system process space as the VAPI 102 and the CAPI 103). Other types of communication between the application 128 and the APIs are possible. A given API can be implemented as a process (one or more computer programs) or as a software library, for example.

The VAPI 102 is responsible for creating and maintaining application objects and performing actions specified by call control objects. An application object (e.g., application object 323) represents the state of an application (e.g., application 128 within business 120). There can be multiple applications within the same business, or multiple applications at different businesses, each having a corresponding application object. As mentioned above, an application is a process (e.g., one or more computer programs) that is responsible for utilizing the VAPI 102, the CAPI 103, or both, to programmatically handle incoming communications and create conversations between users. A conversation comprises communications between two more users that are members of the conversation and can utilize one or more communication channels simultaneously, such as Short Message Service (SMS), Plain Old Telephone Service (POTS), and Voice over Internet Protocol (VoIP), WebRTC, Session Initiation Protocol (SIP), and other over-the-top (OTT) services. For example, a conference call between multiple members that also allows the members to send messages to each other during the call is an example of a conversation.

OTT refers to delivery of audio, video, and other media over the Internet without the involvement of a multiple-system operator in the control or distribution of the content.

An application (such as application 128 at the first business 120) or the conversation service 101 of the multi-channel communication service 100 sends commands to the VAPI 102 that the VAPI 102 processes. As part of the processing, the VAPI 102 reflects any change in the state of an application in the application object (e.g., application object 323). In some implementations, the application object 323 comprises inbound contact numbers 311 registered for the application, a callback address 324 for notifying the application when a new inbound voice call comes in and for receiving a call control object for processing the call, information regarding events 303 that the application would like to receive from the VAPI 102 and the CAPI 103, and information about users 309 that the application knows about. The VAPI 102 responds to commands to register and remove contact numbers, to add and remove users, and to specify which events the application would like to receive.

The inbound contact numbers 311 are one or more identifiers that can be used to reach an application for inbound communications. An inbound contact number can be a string of numeric digits that represent a telephone number for telephony communications such as audio calls and SMS messages. An inbound contact number could also be a VoIP number, or other information needed for communicating using SIP. In the case of a SIP, the contact number could comprise a uniform resource identifier (URI) and authentication information, such as a username and password.

When an inbound voice call comes in, the conversation service 101 of the multi-channel communication service 100 identifies the application object (e.g., application object 323) that has registered the contact number 311 being called. The conversation service 101 then uses the callback address 324 to request a call control object from the application corresponding to the application object 323. In some implementations, the callback address 324 is a Uniform Resource Locator (URL) which, when contacted through HTTP, will respond with a call control object. In other implementations, the callback address is the name of a function or a method that can be invoked by the conversation service 101 to obtain a call control object. Other callback address types are possible. The conversation service 101 then uses the VAPI 102 to perform the actions specified in the call control object. Call control objects will be discussed further below.

The user information 309 in the application object 323 comprises, for each user, a user identifier such as a name and one or more communication channels that the user can be reached through. A communication channel comprises contact information (e.g., telephone number, account name and password, etc.) that can be used to communicate to the user on a particular channel such as the PSTN, VoIP, SIP, SMS or others. When a user is joined to a conversation, one or more of the user's communication channels can be used to communicate with the user. Events 303 are messages sent by the conversation service 101, the VAPI 102, or the CAPI 103 that an application (e.g., application 128 of the first business 120) can register to, receive and, optionally, take action on. By way of illustration, an event indicating that a user has joined a conversation can be sent by the CAPI 103 to the application. Events are discussed further below.

The CAPI 103 is responsible for creating and maintaining conversation objects and for sending conversation messages. Each application can create one or more conversations using the CAPI 103, each having a corresponding conversation object (e.g., conversation object 325 or 327). In the object model, the conversation objects are related to the application objects that correspond to the applications that created the conversations. For example, application object 323 has two conversation objects 325 and 327. An application (e.g., application 128 of the first business 120) or the conversation service 101 sends commands to the CAPI 103 that the CAPI 103 processes. As part of the processing, the CAPI 103 reflects any change to the state of the particular conversation in the conversation object (e.g., conversation object 325). A conversation object (e.g., conversation object 325) represents the state of a particular conversation, including the conversation history (e.g. conversation history 315a). The conversation history is a history of events sent, calls accepted, calls disconnected, messages sent and received, call time for each call, and the amount of data sent and received on each communication channel. Other types of information can be collected as part of the conversation history. The conversation history is stored in the conversation history database 107.

In some implementations, in addition to the conversation history 315a, the conversation object 325 comprises members 317a. The conversation members 317a correspond to the application object users 309 that are joined to a particular conversation. Members of a conversation can communicate with other members of the conversation using one or more of their respective communication channels. A message sent by a member of a conversation, for example, will be automatically broadcast to the other members of the conversation on the respective message communication channel (e.g., SMS) utilized by each member.

The conversation object 325 can optionally include one or more inbound contact numbers 319*a*. The inbound contact numbers 319*a* are one or more numbers that the conversation 325 can be reached at for inbound communications. An inbound contact number can be a string of numeric digits representing a telephone number for telephony communications or SMS messages. An inbound contact number could also be a VoIP number, or other information needed for communicating using SIP.

When an inbound voice call comes in, the conversation service 101 identifies the conversation object (e.g., conversation object 325) that has registered the contact number 319*a* being called. The conversation service 101 then uses the callback address 327*a* of the identified conversation object 325 to request a call control object from the application that created the conversation object 325. In some implementations, the callback address 327*a* is a Uniform Resource Locator (URL) which, when contacted through HTTP, will respond with a call control object. In other implementations, the callback address is the name of a function or a method that can be invoked by the conversation service 101 to obtain a call control object. Other callback address types are possible. The conversation service 101 then uses the VAPI 102 to perform the actions specified in the call control object.

Another type of communication processed by the conversation service 101 is message communication. Messages comprise data that can be sent to a conversation's members or to an individual member using the conversation service 101. Messages sent and received by the conversation service 101 are stored in the message storage database 108. In some implementations, the format of a message is as described in TABLE 1. Other message formats are possible.

TABLE 1

Message Format

| Field | Description |
|---|---|
| Transaction Identifier | A transaction identifier assigned to the message by the conversation service 102. |
| Sender Identifier(s) | The user identifier(s) of the user(s) who sent the message. |
| Recipient Identifier(s) | The user identifier(s) of the user(s) who will be the recipient(s) of the message. |
| Type | Indicates the type of message: text, SMS, audio to be played, audio text-to-speech, audio dual-tone-multiple-frequency (DTMF), and audio record.<br>Audio to-be-played: Play the audio file from a given URL. When sent to a conversation the audio is played to all members. When sent to a member it is only played to that member.<br>Audio text-to-speech: Generates speech to read text specified in the Body. When sent to a conversation the audio is played to everyone. When sent to a member it is only played to that member.<br>Audio record: Record the member indicated by the recipient identifier. |
| Body | This is the content of the message and is of variable length. For example, the body could be the content of an SMS message. For audio to play this could contain the URL of the audio file. |

The conversation service 101 can receive inbound SMS or MMS (text) messages from an SMS provider 132 or an OTT provider 134. The conversation service 101 converts received messages into the message format of TABLE 1. The conversation service 101 assigns each message a sequence number, or transaction identifier, as a reference that may be used to retrieve the messages at a later date from the message storage database 108. The conversation service 101 matches each SMS sender phone number with contact information of a given user in the application model, and uses the user identifier as the sender identifier in the message. If there is no match for a given user, then the sender identifier is set to the SMS message sender's phone number. The conversation service 101 matches each SMS recipient phone number with contact information of a given user in the application model, and uses the user's identifier as the recipient identifier in the message. If there is no match for a given user, then the recipient identifier is set to the SMS message recipient's phone number. The type field of the message is set by the conversation service 101 to be SMS, and the body of the message will contain the content of the SMS message. The conversation service then uses the CAPI 103 to send the message to the users indicated by the recipient identifiers.

When a message is sent using the CAPI 103, the CAPI 103 sends the message to each user indicated in by the recipient identifiers. In some implementations, for a given user, the message is sent using the communication channel associated with the user that is appropriate for the message type. For example, if the message type is SMS, the CAPI 103 will send the message to the user using the contact information of the SMS channel for the user. In other implementations, the message is sent to a given user by the CAPI 103 on as many channels for that user as possible. In further implementations, a message is sent to a given user on a single channel. Outbound messages are sent to the appropriate network (e.g., the SMS provider 132, the OTT provider 134, or one of the telephony systems) by the conversation service 101 on behalf of the CAPI 103.

Messages can be used to send actions and events to conversations or applications (e.g., application 128 of the first business 120) using the CAPI 103. Actions can be sent by conversation members or by conversations. An action is a message that causes the recipient to act in some way. The type field of the message indicates what the action is—such as, for example, mute or unmute a microphone, increase or decrease volume, etc. Events can be sent by members or conversations to keep members abreast of state changes in the conversation. The type field of the event indicates the event type. A knocking type event indicates that a user wishes to join a conversation. A knocking event can be generated by the conversation service 101 when an inbound voice call is for a contact number associated with a conversation. Other types of events indicate that a member has joined or left a conversation (e.g., by ending a call) or that a member is invited to join a conversation. Members of a conversation exist in one of three states: invited, joined, or left. An invited member has been invited to join a conversation but has not yet joined. A joined member is currently joined to a conversation. A "left" member is a member that has left a conversation. Other actions and events are possible.

Figure 4:
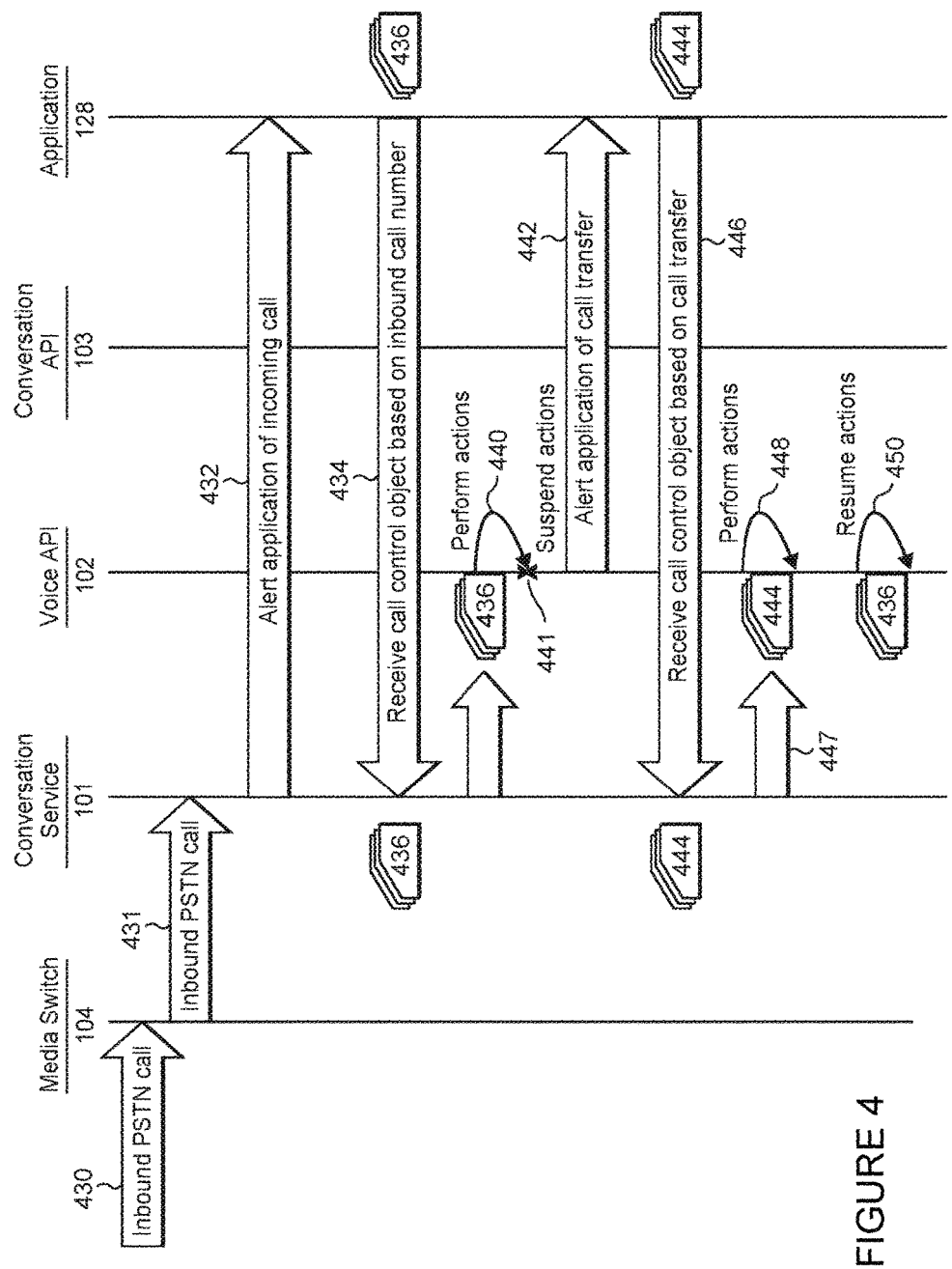
FIG. 4 is a flow diagram that illustrates an example of inbound call processing that is performed by the multi-channel communication service.

FIG. 4 is a flow diagram illustrating an example of inbound call processing described within the context of the object model 301 illustrated in FIG. 3. At step 430, an inbound call, received from the PSTN 144, is received by the media switch 104. The media switch 104 forwards the call to the conversation service 101 at step 431. The conversation service 101 then sends a request 432 (e.g., an HTTP request) to the callback address 324 of the application to which the inbound call is directed. That is, the inbound call number matches an inbound contact number 311 of the application. In response, the application sends a response 434 (e.g., an HTTP response) to the conversation service 101 which comprises a call control object 436 that describes how the inbound call is to be handled. The call control object 436 is received by the conversation service 101, which then invokes the VAPI 102 to perform the actions 440 of the call control object 436. Call control object actions are described in greater detail below.

During performance of the actions, a transfer action is encountered. The transfer action in the call control object causes the VAPI 102 to suspend performance of the actions of the call control object 436 at step 441. At step 442, the VAPI 102 then sends a request (e.g., an HTTP request) to an address specified by a parameter of the transfer action to obtain another call control object to process the transfer action. In this example, the address specified by the transfer action is the same application 128. However, the address could be for a different application. The VAPI 102 responds by sending a call control object 444 for the transfer to the conversation service 101. The conversation service 101 invokes the VAPI 102 at step 447 to perform the actions of the call control object 444 at step 448. Once the second call control object 444 has finished processing (e.g., as a result of the transferred call terminating), the VAPI 102 resumes performance of the actions of the first call control object 436 at step 450.

A call control object is an ordered sequence or stack of one or more objects, such as JavaScript Object Notation (JSON) objects. The objects are processed according to the order in the call control object. Each object specifies an action, and one or more optional switches that control the outcome of the action. Switches may have further parameters that control the switch function.

A connect action connects one endpoint to one or more other connectable endpoints. These multiple endpoints may be specified to ring simultaneously or in sequence by nesting connect actions within the call control object stack. The connect action ends if the endpoint is busy or unavailable and the next action in the stack is executed. The switches supported by the connect action are listed in TABLE 2.

TABLE 2

| Switch | Description | |
|---|---|---|
| eventURL | Asynchronous callback URL that gets called each time one of the following call events are fired. The call states are: 'started', 'ringing', answered, 'busy', 'failed', 'timeout', 'cancelled', 'machine', 'complete'. | Required |
| eventMethod | HTTP method that is used to make the request. Defaults to POST. | Optional |
| backupURL | Backup event URL in case primary is unavailable. | Optional |
| backupMethod | HTTP method that is used to make the request. Defaults to POST. | Optional |
| Timeout | Time in seconds before ringing times out. Defaults to 60 s. | Optional |
| Limit | Time limit of the call in seconds. Defaults to 7200 s. | Optional |
| From | An e.164 or SIP URI specifying whom the call is from | Optional |
| haltOnFail | Whether to halt the stack flow if a connect action fails. Defaults to false. | Optional |

TABLE 2-continued

| Switch | Description | |
|---|---|---|
| Endpoint | An object or array of objects. An endpoint can be a single or mixed collection of e.164 numbers, SIP URIs or conference names. | Required |

Another action is a transfer action, which uses a URL to transfer control of a call to another call control object. Below are the switches supported by the transfer action.

TABLE 3

| Switch | Description | |
|---|---|---|
| transferURL | The URL that returns the new call control object. | Required |
| transferMethod | The HTTP method used to call the redirect JSON object. Defaults to 'POST'. | Optional |
| callbackURL | URL of callback that is called following completion of a connect action. | Optional |
| callbackMethod | HTTP method of the callback. Options are 'GET', or 'POST'. Defaults to 'POST'. | Optional |

The talk action is used to read back text to the call using synthesized speech. Switches supported by this action are described in the table below.

TABLE 4

| Switch | Description | |
|---|---|---|
| loop | Whether to loop once the TTS ends. Options are an integer 0 >= loop < 10 where 0 loops infinity or 'false'. Defaults to 'false'. | Optional |
| text | Body of the text message. 0 > text < 1500. Commas control pauses in speech. | Required |
| level | Set the audio level of the TTS. −1 >= level =< 1. Defaults to 0. | Optional |
| gender | The gender to use for TTS. Options are 'male' or 'female'. Defaults to female. | Optional |
| language | The language and locale used to read the message in the form "language-locale". Defaults to "en-us". | Optional |

The stream action may be used to play back a stored audio file to the call. Switches supported by the stream action are described below.

TABLE 5

| Switch | Description | |
|---|---|---|
| streamURL | An object or array of audio URLS to stream. | Required |
| level | Set the audio level of the stream. −1 >= level =< 1. Defaults to 0. | Optional |
| Loop | Whether to loop the stream once the stream ends. Options are an integer 0 >= loop < 10 where 0 loops infinity or 'false'. Defaults to 'false'. | Optional |

In some embodiments, a record action may be used to record all or a part of a call. Switches supported by the record action are described below.

TABLE 6

| Switch | Description | |
|---|---|---|
| Format | Format of the file. Options are 'mp3', 'wav' or 'vorbis'. Defaults to 'mp3'. | Optional |
| Split | Whether to split the recording into two separate recordings per leg (prefixed with 'a_' or 'b_'. Options are 'true' or 'false'. Defaults to 'false'. | Optional |
| startOnAnswer | Whether to start recording only when the far end answers (only relevant if it precedes a Connect action). Defaults to true. | Optional |
| endOnKey | Whether to end the recording on the digit that is pressed and implement the next action in the stack (if there is one). Options are a digit 0-9, *, # or false. Defaults to false. | Optional |
| destionationURL | Optional URL to submit the recording (as a multipart form upload) once the call is finished if it is not hosted by the system 100. If omitted, the recording is hosted by the system 100. | Optional |
| Streamed | If destinationUrl is specified, whether to stream the recording immediately or uploaded via a multipart form submission once the recording has finished. Options are 'true' or 'false'. Defaults to 'false'. | Optional |
| timeLimit | Time in seconds that the recording is limited to. Defaults to recording the call until it ends. Only valid if recording hosted by the system 100 and not streamed. | Optional |
| validityTime | Time in minutes that the recording is valid for until it is deleted if hosted by the system 100. Deault is indefinite. | Optional |
| callBackURL | Asynchronous callback URL that gets called following a recording that returns the URL of the recording and other meta data. Only valid if recording hosted by the system 100. | Optional |
| callBackMethod | HTTP method that is used to make the request. Defaults to POST. | Optional |
| backupURL | Backup callback URL in case primary is unavailable. | Optional |
| backupMethod | HTTP method that is used to make the request. Defaults to POST. | Optional |
| beepStart | Whether to beep when the recording starts. Options are 'true' or 'false'. Defaults to false. | Optional |
| beepFinish | Whether to beep when the recording finishes. Options are 'true' or 'false'. Defaults to false. | Optional |
| Secure | Whether to require credentials to access the file or public. Options are 'true' or 'false'. Defaults to 'false'. | Optional |

In some embodiments, a delay action may be used to pause the execution of the call stack before continuing the execution of further actions in the stack. Switches supported by the delay action are described below.

TABLE 7

| Switch | Description | |
|---|---|---|
| time | Time in seconds to delay the execution of the next action in the call stack. 1 > time < 300. Defaults to 1. | Optional |
| machineDetection | Whether to cancel the pause if a machine detection (a beep) is detected. Options are 'true' or 'false'. Defaults to 'false'. | Optional |

An input action may collect digit or speech input from a call and process that input. Digit input may be input from the caller pressing numerical keys on their device. Switches supported by the input action are described below.

TABLE 8

| Switch | Description | |
|---|---|---|
| timeOut | The time in seconds between key presses or pauses in speech that the result gets submitted if the next digit is not pressed or word is not spoken once entry has begun. Defaults to 3. | Optional |
| submitOnHash | Whether to submit the result to the callback URL when the # key is pressed. If omitted the result is automatically submitted after a pause of timeOut once entry has begun. | Optional |
| callBackURL | Asynchronous callback URL that gets called following digit or speech entry. Posts back to the calling URL if omitted. | Optional |
| callBackMethod | HTTP method that is used to make the request. Defaults to POST. | Optional |

A reject action may be used to reject an incoming call without first picking up the call. Switches supported by the reject action are described below.

TABLE 9

| Switch | Description | |
|---|---|---|
| reason | Describes the reason for the rejection Options are 'rejected' or 'busy'. Defaults to 'rejected'. | Optional |

TABLE 9-continued

| Switch | Description | |
|---|---|---|
| delay | If included the call is answered and then hung up after a delay in seconds. | Optional |

A conference action allows a user to create a conference call. Switches supported by this action allow the conference call to be moderated by a host and recorded, among other things. In some embodiments, the conference call may be destroyed by the VAPI 102 when the number of participants reaches zero. A conference action supports the following switches.

TABLE 10

| Switch | Description | |
|---|---|---|
| Name | The name of the conference room. Names have to be unique per account. | Required |
| Muted | Whether a participant enters muted, and stays muted until unmuted. Options are 'true' or 'false'. Defaults to 'false' | Optional |
| eventUrl | Asynchronous callback URL that gets called each time the following call events are fired: 'conf_started', 'conf_ended', 'participant_joined', 'partcipant_left' & 'dtmf'. Extra meta data e.g. recording URL, cost, time etc. is returned on 'conf_ended'. | Optional |
| eventMethod | HTTP method that is used to make the request. Defaults to POST. | Optional |
| backupUrl | Backup event URL in case primary is unavailable | Optional |
| backupMethod | HTTP method that is used to make the request. Defaults to POST. | Optional |
| Hosted | A hosted conference is a complex conference object that has the ability to moderate, authenticate and play custom messages to participants. | Optional |
| Record | Whether to record the conference. Options are 'true' or 'false'. Defaults to 'false'. | Optional |
| enterSound | Whether to play a sound when a participant enters. Options are 'true' which plays a system beep, 'false' or a stream object. Defaults to false. | Optional |
| exitSound | Whether to play a sound when a participant exits. Options are 'true' which plays a system beep, 'false' or a stream object. Defaults to false. | Optional |
| musicOnHoldUrl | Options are stream object that plays music when a participant is part of a conference but not active (note: if a hosted conference and not specified, system MOH is used). | Optional |
| startOnEnter | Whether to start the conference when the caller joins. Defaults to true. If set to false, callers hear MOH until a participant joins that has startOnEnter set to true. | Optional |
| endOnEnter | Whether to end the conference when the caller exits. Defaults to false. | Optional |

Further, a hosted conference action supports the additional switches described in the table below.

TABLE 11

| Switch | Description | |
|---|---|---|
| location | Option on where to host the conference to minimize latency. Options are 'us-1', 'eu-1, and 'ap-1'. Defaults to 'us-1'. | Optional |
| preannouncement | Options are a talk object or 'false'. A talk object is spoken after participants join the conference but before they are authorized. Defaults to 'false'. | Optional |
| authorization | Whether to use PINs to authorize participants and moderators<br>{<br>"requestAnnouncement":<br>{...<talkobject>...},<br>"failedAnnouncement":<br>{...<talkobject>...},<br>"participantPin":<br>"14345",<br>"moderatorPin": "5678"<br>} | Optional |
| recordName | Whether to ask participants to record their name. Options are talk & input objects, or 'false'. | Optional |

TABLE 11-continued

| Switch | Description | |
|---|---|---|
| postAnnouncement | Options are a talk object or 'false'. A talk object is spoken after participants are authorized. Defaults to 'false'. | Optional |
| nameOnEnter | Options are a talk object that appends the name recorded in recordName to the TTS e.g. 'Tony has joined the conference', or 'false'. Defaults to 'false' (If used overrides enterSound). | Optional |
| nameOnExit | Options are a talk object that appends the name recorded in recordName to the TTS e.g. 'Tony has left the conference', or 'false'. Defaults to 'false' (If used overrides exitSound). | Optional |
| moderatorControls | Options are 'true' or 'false'. Enables DTMF controls for moderator (see below). Defaults to 'false'. | Optional |

Actions may be nested within the stack of a call control object. That is, an action may comprise one or more nested actions which are performed by the VAPI 102 before performance of the outer action.

Figure 5:
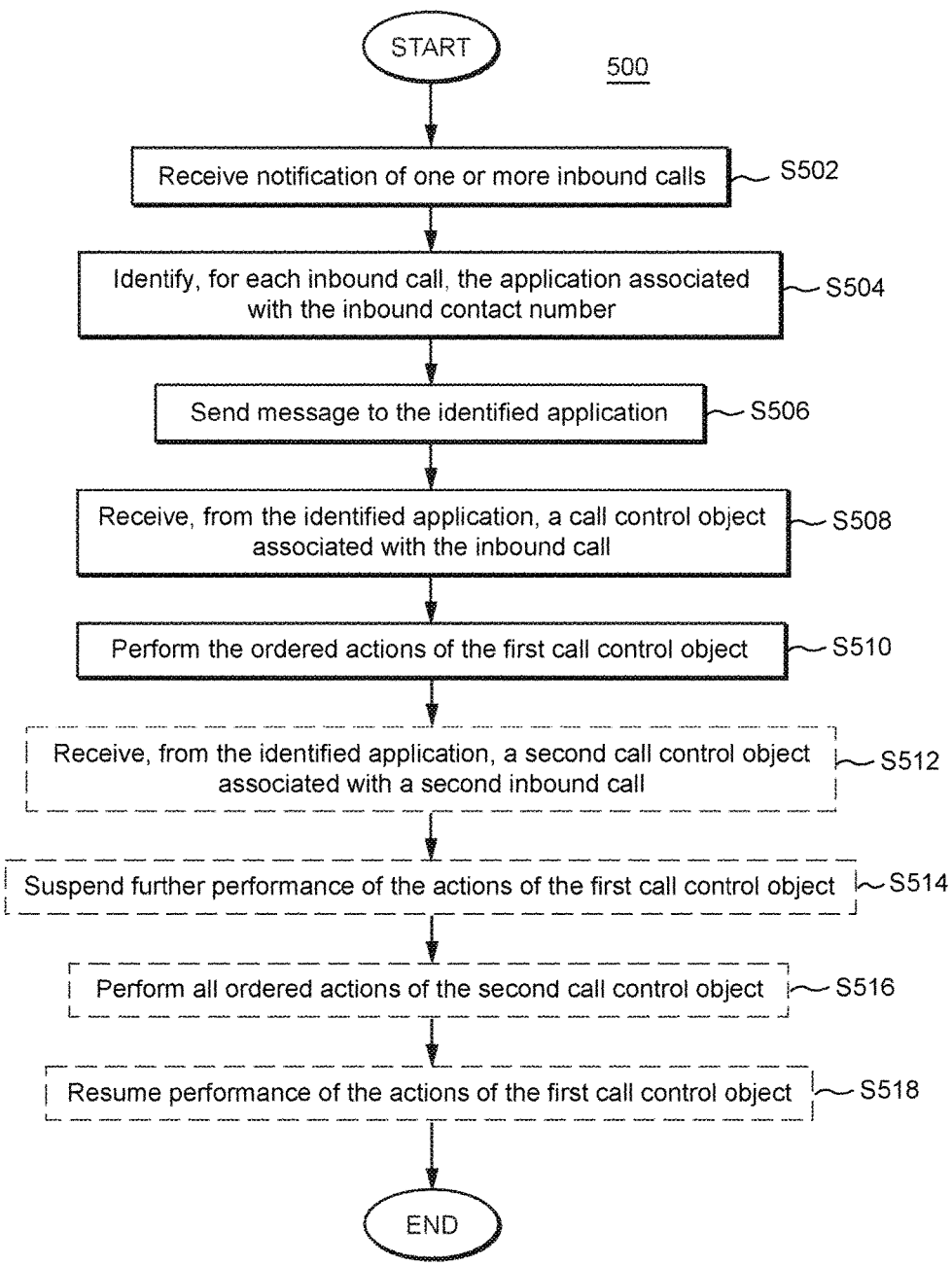
FIG. 5 is a flow chart depicting a method of call processing that is performed by the multi-channel communication service.

FIG. 5 is a flow chart illustrating an example technique 500 for processing a call in accordance with the invention. In step S502 the VAPI 102 receives notification of one or more inbound calls from the conversation service 101. In step S504, the VAPI 102 identifies which application is associated with each inbound call contact number. At S506, the VAPI 102 then notifies the identified application of the inbound call.

At S508, the application sends the VAPI 102 a call control object. As previously discussed, the inbound contact number may provide parameters determining the actions in the call control object. At S510, the VAPI 102 executes the call control object by performing the ordered actions in the stack of JSON objects.

In some embodiments, at S512, the application may send the VAPI 102 a second call control object resulting from the receipt of a second inbound call. This second inbound call may generate a unique call control object based on its own parameters. As a result of receiving a more recent, second call control object the VAPI 102 suspends the performance of the actions of the first call control object, as described in step S514. At step S516 the VAPI 106 executes all actions in the second call control object for the second inbound call received by the application. As an example, an action in this call control object may be transferring this second inbound call to another user by using the transfer action. In step S518, the VAPI 102 resumes and complete execution of the remaining actions in the first call control object.

Figure 6:
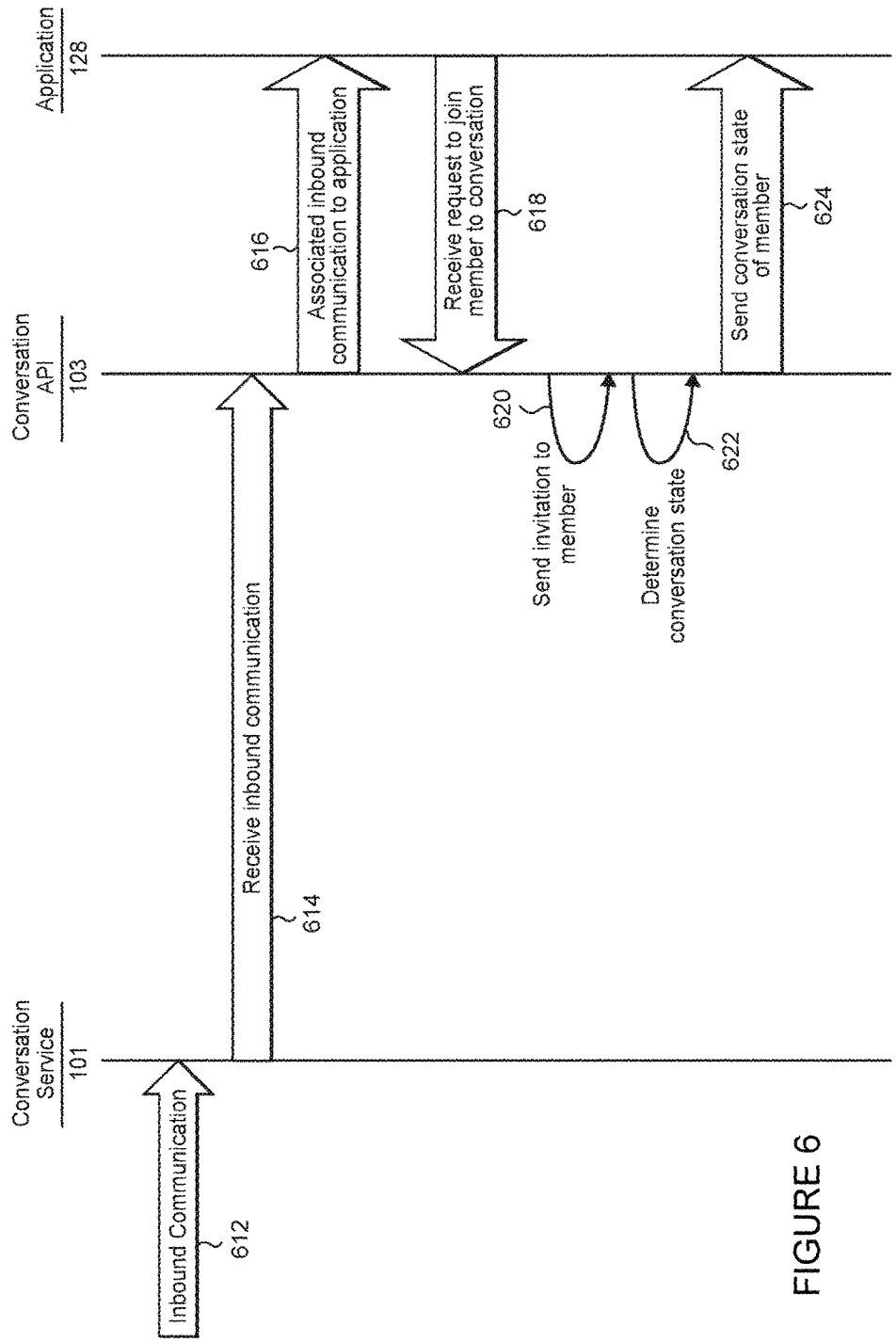
FIG. 6 is a flow diagram that illustrates an example of call processing performed by the multi-channel communication service to join members to a conversation.

FIG. 6 is a flow diagram illustrating an example of joining a member to a conversation in accordance with the subject invention. The conversation service 101 receives an inbound communication at step 612. This communication may be an SMS message or may have come from the media switch as an incoming audio telephone call. At step 614, the CAPI 103 receives the inbound communication from the conversation service 101. As previously described, the CAPI 103 creates a conversation object for each new communication.

The CAPI 103 checks the number pools of a plurality of applications to associate the inbound communication to an application (e.g., the application 128 of the first business 120) whose number pool contains the contact number of the inbound communication. That is, for one or more inbound calls, the inbound call numbers match the respective inbound contact numbers of a plurality of applications, as previously described. At step 616, the CAPI 103 notifies the identified application of the inbound communication. In response, at step 618, the application sends a request to the CAPI 103 to invite the member associated with the inbound communication to join the conversation previously created by the CAPI 103. In some embodiments, the request sent at step 618 may be encrypted. At step 620, the CAPI 103 sends an invitation to the member to join the conversation. At step 622, the CAPI 103 determines the conversation state of the member, meaning whether or not the member has joined the conversation. If the member has joined the conversation, the member may trigger a "joined" event upon their entry into the conversation. At step 624, the CAPI 103 relays the conversation state of the member to the associated application.

There are other possible events corresponding to various conversation and member states besides the examples provided above. The events are recorded by the conversation service 101 and are triggered by various conversation or member states or actions. These events may be tagged with the conversation object sequence number and a timestamp. Possible events and their descriptions are listed in the table below.

TABLE 12

| Event | Description |
|---|---|
| app:knocking | An inbound knock not attached to a conversation, but in an app number pool. |
| user:presence | Result of the presence resource being used and updated by the availability of sessions for a user. |
| conversation:knocking | A member is knocking, or requesting to join conversation. |
| conversation:destroyed | A conversation object is destroyed. |
| conversation:created | A conversation object is created. |
| conversation:invite | Event asking a member to join. |
| conversation:join | Event from a member requesting to join. |
| member:joined | Event from a member on join transition. |
| member:left | Member left a conversation. |
| member:media | Change in the media presence state. |

Figure 7:
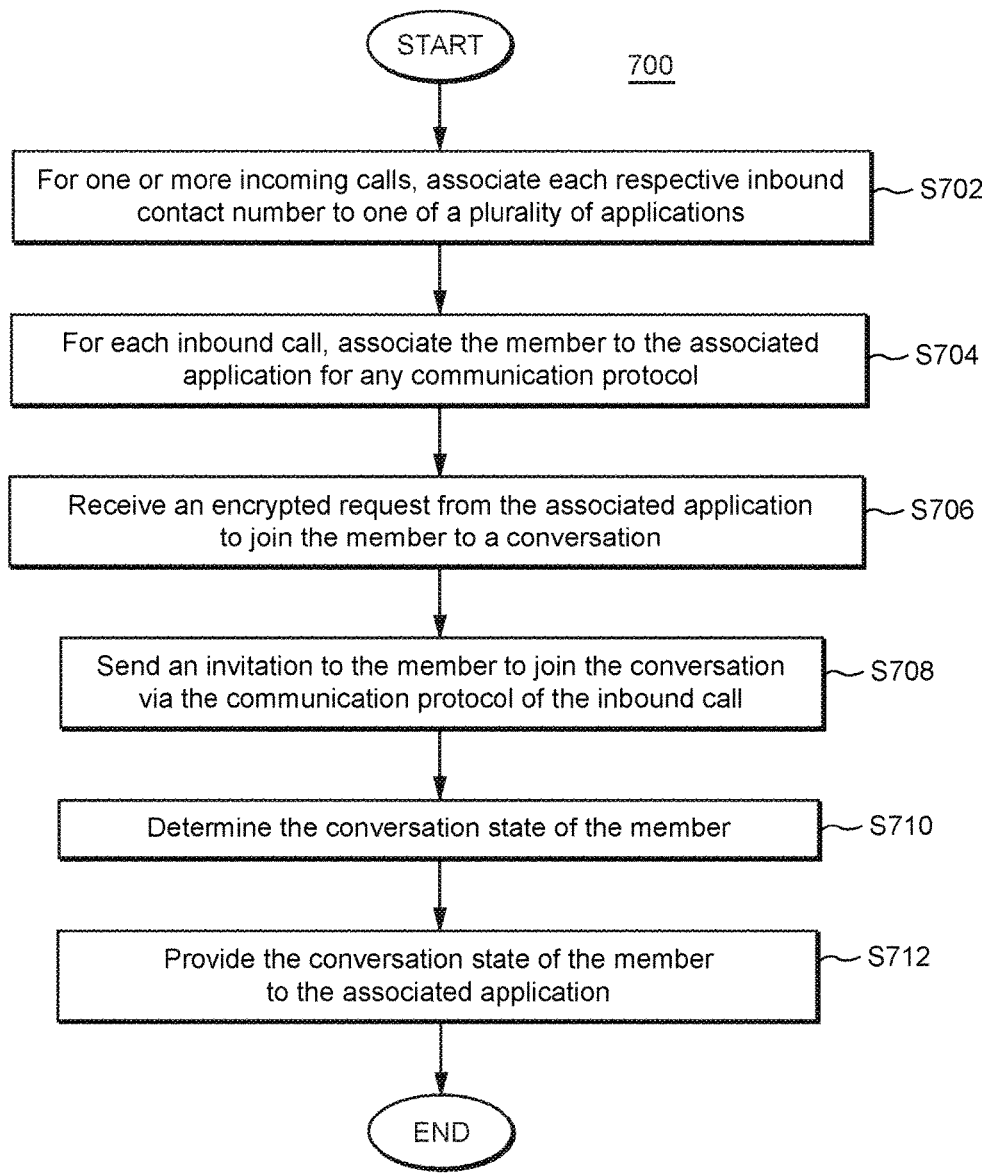
FIG. 7 is flow chart depicting a method of joining members to a conversation that is performed by a multi-channel communication service.

FIG. 7 is a flow chart showing an example method 700 for joining members to a conversation. At step S702, the CAPI 103 associates one or more inbound communications respectively to a plurality of applications. As previously discussed, the CAPI 103 associates each inbound communication, via its communication protocol, to an application, respectively, based on its inbound contact number. At step S704, the CAPI 103 associates each inbound communication to a particular member of an application. This inbound communication may be received over any of the previously discussed communication protocols.

At step S706, the identified application sends the CAPI 103 an encrypted request to add each member associated with the inbound communication to a conversation. Multiple members may be invited to join one conversation over multiple communication protocols simultaneously. At step S708, the CAPI 103 sends an invitation to each member to join the conversation via the appropriate communication protocol. At step S710, the CAPI 103 determines the conversation state of each member (e.g., whether or not each member accepted the invitation to join the conversation). At step S712, the CAPI 103 sends the conversation state of each member to the identified application.

Figure 8:
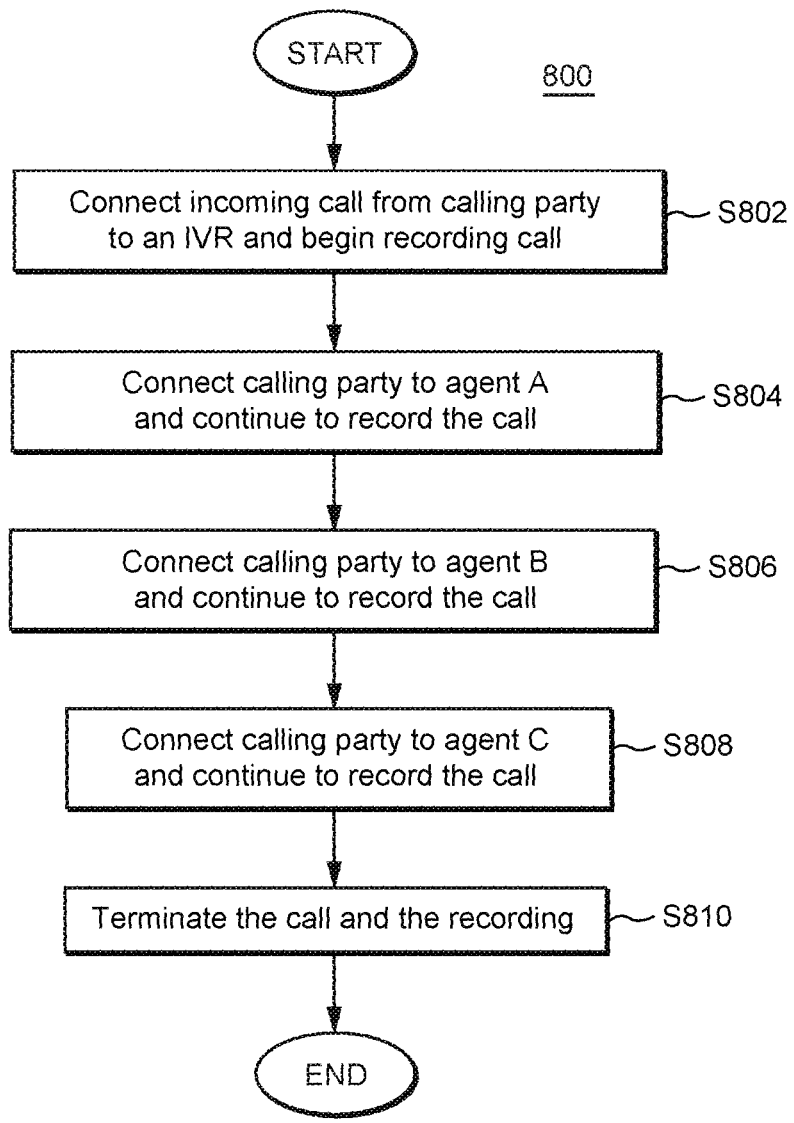
FIG. 8 is a flow chart that depicts a first method of recording a call that is performed by a multi-channel communications service.

The object-oriented call processing techniques described above can be used to help record conversations that are set up and handled by the multi-channel communication service 100. FIG. 8 is a flowchart illustrating steps of a method 800 which would be performed to record a telephone conversation. Correspondingly, FIGS. 9A-9D diagrammatically illustrate how different members can participate in the telephone communication, how their participation in the telephony communication is recorded by the multi-channel communication service 100, and how the same telephony would be recorded by a prior art recording system. FIG. 9A illustrates the different time periods of a call. FIG. 9B illustrates which parties are participating in a call at the time periods identified in FIG. 9A. FIG. 9C illustrates how the call is recorded by a multi-channel communication service. FIG. 9D illustrates how the same call would be recorded by a prior art recording method.

The method 800 begins and proceeds to step S802 where a calling party is connected to a business' customer service line, and specifically, to an interactive voice response system (IVR) operated by the business. As is well known to those of ordinary skill in the art, an IVR can be used to initially direct a caller to the most appropriate customer service agent. As illustrated in FIG. 9B, during time period 1, the calling party interacts with the IVR. As also illustrated in FIG. 9B, the incoming call is setup as a conference call, and during time period 1, the only two participants in the conference call are the calling party and the IVR.

When the calling party is first connected to the IVR via the conference call, the multi-channel communication service 100 begins to record the call. As illustrated in FIG. 9C, the recording can be a two track recording, where audio generated by the calling party is recorded in track 1, and where audio generated by the IVR and which is heard by the calling party is recorded in track 2. Keeping two separate tracks can make it easier to utilize the recording for various purposes, such as transcriptions. Also, because the two tracks are being recorded simultaneously in a single recording, the two tracks are automatically synchronized to one another.

The calling party's interactions with the IVR will result in the calling party being connected to a first customer service agent, labeled in FIGS. 9B-9D as Agent A. As shown in FIG. 8, at step S804 the calling party is connected to Agent A. As reflected in FIG. 9B, the communication is still configured as a conference call. Thus, at the end of time period 1, the IVR is removed from the conference call and Agent A is added to the conference call. As shown in FIG. 9C, the recording created by the multi-channel communication service 100 will be continuous. As a result, audio generated by the calling party is still recorded in track 1. However, during time period 2, while the calling party is interacting with Agent A, the audio generated by Agent A is recorded in the track 2 of the recording.

At the end of time period 2, Agent A decides it is best for the calling party to talk with a second customer service agent, which is labeled Agent B in FIGS. 9B-9D. In step S806 of the method illustrated in FIG. 8, the calling party is connected to Agent B. This means that at the end of time period 2, Agent A is removed from the conference call and Agent B is added to the conference call. During time period 3, the calling party interacts with Agent B. As illustrated in FIG. 9C, audio generated by the calling party is still recorded in track 1 of the continuous recording, and audio generated by Agent B during time period 3 is recorded in track 2 of the continuous recording.

At the end of time period 3, Agent B decides it is best for the calling party to talk with yet a third customer service agent, which is labeled Agent C in FIGS. 9B-9D. In step S808 of the method illustrated in FIG. 8, the calling party is connected to Agent C. This means that at the end of time period 3, Agent B is removed from the conference call and Agent C is added to the conference call. During time period 3, the calling party interacts with Agent C. As illustrated in FIG. 9C, audio generated by the calling party is still recorded in track 1 of the continuous recording, and audio generated by Agent C during time period 4 is recorded in track 2 of the continuous recording. Finally, in step S810 of the method illustrated in FIG. 8, the calling party completes the call, the call itself is terminated, and the recording ends.

FIG. 9D illustrates the type of recordings that would be made by prior art systems under the same circumstances discussed above. As shown in FIG. 9D, when the calling party calls the business via a prior art system, the calling party is connected to the IVR, and a two track recording is made. Audio generated by the calling party is recorded in track 1, and audio generated by the IVR is recorded in track 2. However, when the calling party is connected to Agent A, the first recording ends, and a new recording begins. The second recording is also a two track recording, where audio generated by the calling party is recorded in track 1 and audio generated by Agent A is recorded in track 2. This second recording continues until the calling party is connected to Agent B. At this point, the second recording ends, and a third recording begins. Here again, the third recording will have audio generated by the calling party in track 1 and audio generated by Agent B in track 2. This same pattern repeats when the calling party is switched to Agent C, and a fourth recording of the calling party's interaction with Agent C is generated.

With a prior art recording system, four separate recordings are created, as illustrated in FIG. 9D. If an individual wishes to review what transpired during the calling party's interaction with the business, it is necessary to locate and listen to four separate recordings. Alternatively, during some post-call processing, the four separate recordings must be stitched together in the correct order and a new file with the complete recording must be saved.

In contrast, the multi-channel communication service 100 is capable of generating a single recording while the call is ongoing. This means that the recording will be available for immediate review as soon as the calling party hangs up. Also, no system resources need be used for post-call processing to stitch together multiple recordings to re-create the calling party's experience.

Also, a multi-channel communication service includes an API which allows the business to specify exactly what is recorded during customer service calls. So, for example, the business could specify that only one continuous, two track recording be generated as explained above. However, the business could also specify that a one or more additional recordings also be generated to capture each Agent's experience. This means that at the same time that a continuous two track recording as explained above is being created, a separate two track recording could also be simultaneously generated to capture Agent A's experience. That two track recording could only cover time period 2 in the diagrams provided in FIGS. 9A-9C. The first track of the recording would have the audio generated by Agent A during time period 2, and the second track of the recording could have all the audio generated by the calling party during time period 2. Similar recordings could also be made to capture the experience of Agent B and Agent C, or even what is experienced by the IVR during time period 1.

Figure 10:
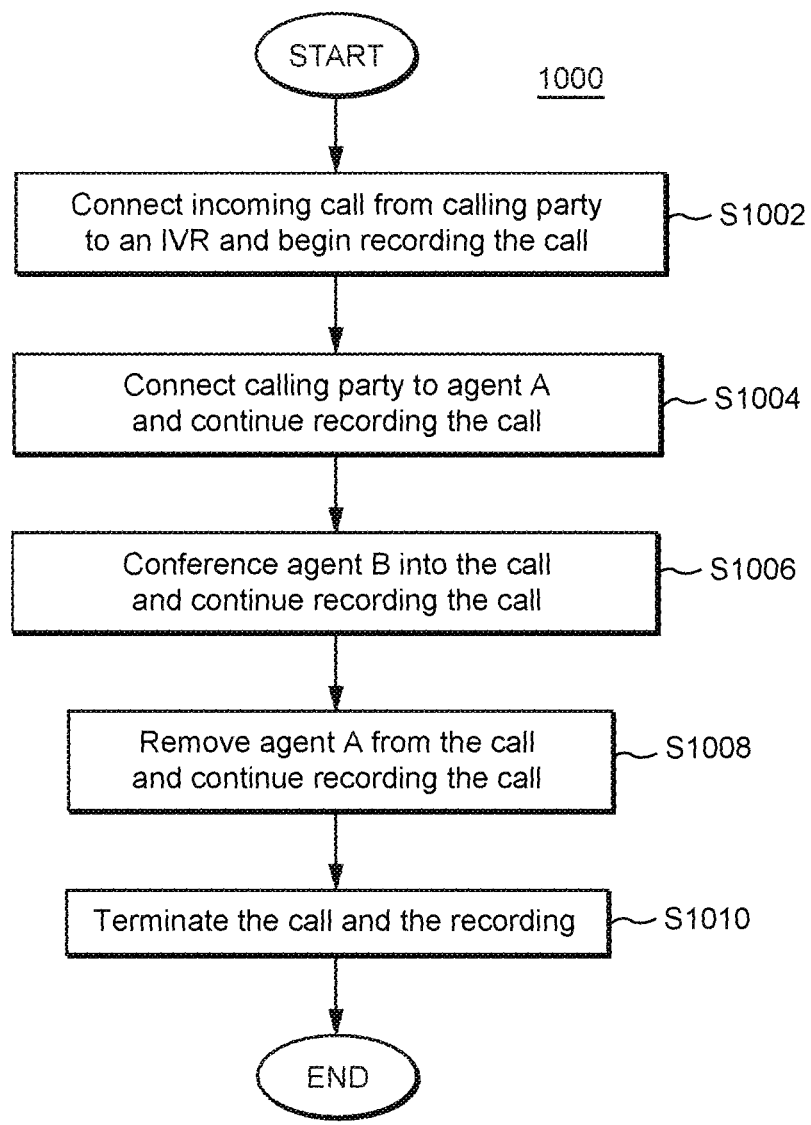
FIG. 10 is a flow chart that depicts a second method of recording a call that is performed by a multi-channel communications service.

FIG. 10 illustrates a flowchart of a second method 1000 which can be utilized to record a calling party's interactions with a business' customer service department. Correspondingly, FIGS. 11A-11D illustrate how the calling party is connected to various individuals within the business, and how a recording of the user's experience is made. The method 1000 begins and proceeds to step S1002 where a calling party is connected to a business' customer service line, and specifically, to an IVR operated by the business. As illustrated in FIG. 11B, during time period 1, the calling party interacts with the IVR. As also illustrated in FIG. 11B, the incoming call is setup as a conference call, and during time period 1, the only two participants in the conference call are the calling party and the IVR.

When the calling party is first connected to the IVR via the conference call, the multi-channel communication service 100 begins to record the call, as illustrated in FIG. 11C. Here again, the recording can be a two track recording, where audio generated by the calling party is recorded in track 1, and where audio generated by the IVR and which is heard by the calling party is recorded in track 2.

The calling party's interactions with the IVR will result in the calling party next being connected to a first customer service agent, labeled in FIGS. 11b-11D as Agent A. As shown in FIG. 10, at step S1004 the calling party is connected to Agent A. As reflected in FIG. 11B, the communication is still configured as a conference call. Thus, at the end of time period 1, the IVR is removed from the conference call and Agent A is added to the conference call. As illustrated in FIG. 11C, the recording created by the multi-channel communication service 100 will be continuous. As a result, audio generated by the calling party is still recorded in track 1. However, during time period 2, while the calling party is interacting with Agent A, the audio generated by Agent A is recorded in the track 2 of the recording.

At the end of time period 2, Agent A decides to enlist the assistance of a second customer service agent, Agent B, to help satisfy the calling party's requests. In step S1006 of the method illustrated in FIG. 10, Agent B is added to the conference call. During time period 3, the calling party interacts with Agents A and B. As illustrated in FIG. 11C, audio generated by the calling party is still recorded in track 1 of the continuous recording, and audio generated by Agents A and B during time period 3 is recorded in track 2 of the continuous recording.

At the end of time period 3, Agent A is no longer needed, so Agent A is removed from the conference call, and the calling party continues to interact with Agent B during time period 4. In step S1008, Agent A is removed from the conference call. During time period 4, the calling party interacts only with Agent B. As illustrated in FIG. 11C, audio generated by the calling party is still recorded in track 1 of the continuous recording, and audio generated by Agent B during time period 4 is recorded in track 2 of the continuous recording. Finally, in step S1010 of the method illustrated in FIG. 10, the calling party completes the call, the call itself is terminated, and the recording ends.

As illustrated in FIG. 11D, in the prior art recording system, when Agent A decides to conference in Agent B at the end of time period 2, even in the prior art system, Agent A has created a conference call. As a result, even in the prior art system, it may be possible to create a continuous recording of time periods 2, 3 and 4. However, the prior art system will still make a separate recording of the calling party's interactions with the IVR during time period 1.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for managing multiple channels of communications between users comprising:
    receiving, at a conversation object generator, one or more inbound communications sent from a communication service;
    associating each of the one or more inbound communications to one of a plurality of corresponding client applications;
    sending a notification to each of the corresponding client applications;
    receiving from each of the corresponding client applications a request to invite users associated with the one or more inbound communications to join a conversation created by the conversation object generator;
    sending one or more invitations to the users associated with the one or more inbound communications to join the conversation;
    determining a conversation state of the users associated with the one or more inbound communications; and
    relaying the conversation state of the users associated with the one or more inbound communications to the corresponding client applications.

2. The method of claim 1 wherein the one or more inbound communications are on channels selected from the group consisting of SMS, POTS based telephony, VoIP based telephony, WebRTC, SIP and an over-the-top service.

3. The method of claim 1 wherein the conversation created by the conversation object generator is represented by a conversation object that comprises at least two members communicating via one or more of the channels.

4. The method of claim 3 wherein the at least two members correspond to at least two users of the corresponding client applications that sent the request to invite.

5. The method of claim 3 wherein the status of a member of a conversation object is selected from the group consisting of invited, joined and left.

6. The method of claim 5 wherein an "invited" member has been invited to join a conversation but has not yet joined, a "joined" member is currently joined to a conversation and a "left" member is a member that has left a conversation.

7. The method of claim 1 wherein the associating is performed by matching a destination identifier associated with the one or more inbound communications to a contact identifier associated with one of the plurality of the corresponding client applications.

8. The method of claim 1 wherein multiple users are invited to join the conversation over multiple communication protocols.

9. The method of claim 1 further comprising associating the inbound communication to a second client application.

10. Apparatus for managing multiple channels of communications between users comprising:
    a conversation object generator that performs the steps of:
        receiving, at a conversation object generator, one or more inbound communications sent from a communication service;
        associating each of the one or more inbound communications to one of a plurality of corresponding client applications;
        sending a notification to each of the corresponding client applications;
        receiving from each of the corresponding client application a request to invite users associated with the one or more inbound communications to join a conversation created by the conversation object generator;
        sending one or more invitations to the users associated with the one or more inbound communications to join the conversation;
        determining a conversation state of the users associated with the one or more inbound communications; and
        relaying the conversation state of the users associated with the one or more inbound communications to the corresponding client applications.

11. The apparatus of claim 10 wherein the one or more inbound communications are on a channel selected from the group consisting of SMS, POTS based telephony, VoIP based telephony, WebRTC, SIP and an over-the-top service.

12. The apparatus of claim 10 wherein the conversation created by the conversation object generator is represented by a conversation object that comprises at least two members communicating via one or more of the channels.

13. The apparatus of claim 12 wherein the at least two members correspond to at least two users of the corresponding client applications that sent the request to invite.

14. The apparatus of claim 10 wherein the associating is performed by matching a destination identifier associated with the one or more inbound communications to a contact identifier associated with one of the plurality of the corresponding client applications.

15. The apparatus of claim 10 wherein multiple users are invited to join the conversation over multiple communication protocols.

16. The apparatus of claim 15 wherein the status of a member of a conversation object is selected from the group consisting of invited, joined and left.

17. The apparatus of claim 16 wherein an "invited" member has been invited to join a conversation but has not yet joined, a "joined" member is currently joined to a conversation and a "left" member is a member that has left a conversation.

18. The apparatus of claim 10 further comprising associating the one or more inbound communications to a second client application.

19. A multi-channel communication system for managing multiple channels of communications between users comprising:
    a conversation service sub-system;
    a voice application programming interface in communication with the conversation service sub-system; and
    a conversation application programming interface (CAPI) in communication with the voice application programming interface and the conversation service sub-system, the CAPI generating objects that represent the status of a conversation and status of one or more users of the conversation, wherein when the CAPI receives an inbound communication setup request sent from the communication service sub-system, the CAPI sends a notification about the setup request to a client application corresponding to an intended recipient of the communication, and wherein when the CAPI subsequently receives from the client application a request to invite the intended recipient to join a conversation, the CAPI sends an invitation to the intended recipient asking the intended recipient to join the conversation.

20. The multi-channel communication system of claim 19, wherein when the CAPI joins a participant to a conversation, the CAPI sends an object representing the joined status of the participant to a client application corresponding to the participant.

\* \* \* \* \*